Nov. 29, 1949  R. O. ISENBARGER  2,489,781
SEAL
Filed Feb. 14, 1947
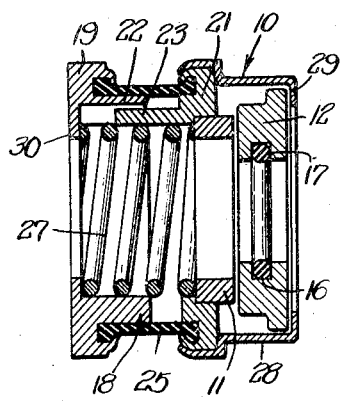
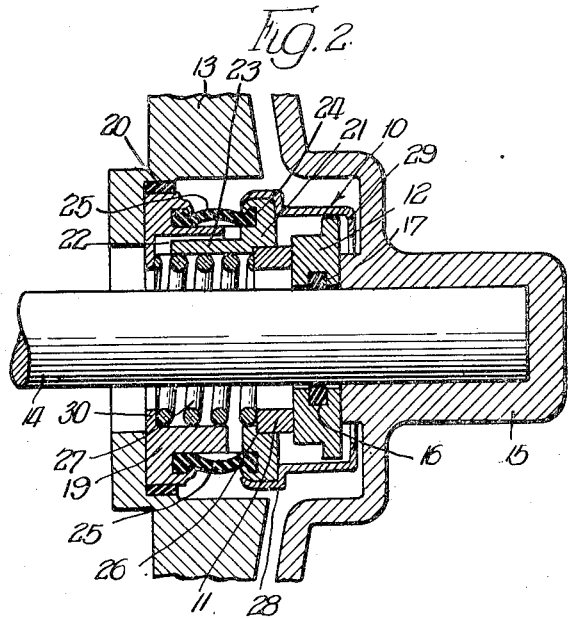
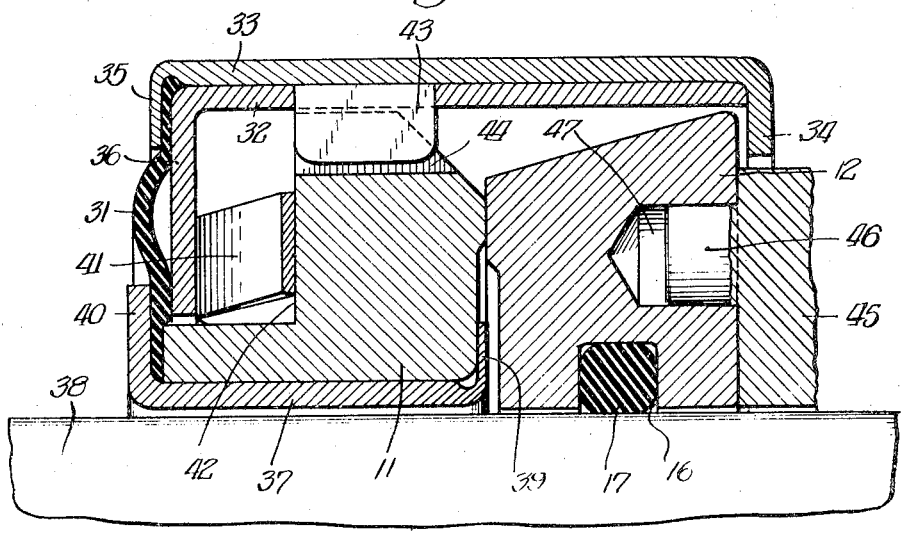
INVENTOR.
Robert O. Isenbarger,
BY
Cromwell, Greist & Warden
Attys.

Patented Nov. 29, 1949

2,489,781

UNITED STATES PATENT OFFICE 2,489,781

SEAL

Robert O. Isenbarger, Chicago, Ill., assignor to Chicago Rawhide Manufacturing Company, Chicago, Ill., a corporation of Illinois Application February 14, 1947, Serial No. 728,659

8 Claims. (Cl. 286—11)

This invention pertains in general to a shaft seal or the like, adapted to be associated with a pair of relatively rotatable parts to prevent leakage of fluid therebetween.

It is an object of the invention to provide a unitary seal assembly of the type described which is of completely self-contained construction, including a sealing ring adapted to be mounted in fixed relation to one of a pair of relatively rotatable parts and a coacting mating ring having relatively fixed engagement with the other of said parts, said seal assembly having further provisions to prevent passage of fluid at any point radially or axially thereof.

A more specific object is to provide a completely self-contained sealing and mating ring assembly of the type referred to, wherein one of the rings is associated with a flexible, diaphragm-type mounting and supporting construction which effectively seals the assembly at points other than those sealed by said rings.

A still further object is to provide a composite, self-contained sealing ring and mating ring assembly, one of which rings is adapted to be associated with a shaft or the like in non-rotative relation thereto and is accordingly provided with an internal packing which sealingly engages said shaft member.

The foregoing statements are indicative in a general way of the nature of the invention, but other and more specific objects will be apparent to those skilled in the art upon a full understanding of the construction and operation of the device.

Two embodiments of the invention are presented herein for purpose of exemplification, but it will be appreciated that the invention is susceptible of incorporation in other modified forms coming equally within the scope of the appended claims.

In the drawings,

Fig. 1 is a view in longitudinal section through the axis of a seal in accordance with one embodiment of the invention;

Fig. 2 is a fragmentary view in section similar to Fig. 1, illustrating the seal thereof in operative installed relation to a pair of relatively rotatable parts, such as a pump impeller and shaft or housing; and Fig. 3 is an enlarged fragmentary view in longitudinal axial section, illustrating the seal in accordance with a further modification thereof.

This invention relates to improvements in a self-contained shaft or like seal characterized by coacting sealing and mating rings which are fixedly engageable respectively with a pair of relatively rotatable parts, said rings having coacting sealing surfaces effecting a rotative, sliding seal. A feature of the assembly is that the aforesaid rings are permanently housed in a sealed housing structure including a flexible diaphragm and a sheet metal casing, the rings being capable of yielding end or axial movement in said structure in operation and being axially restrained by the casing thereof to prevent separation prior to assembly to the relatively rotatable parts which are to be sealed. Two embodiments characterized by these features are illustrated, distinguished by the fact that the flexible diaphragm referred to is axial and sleeve-like in one instance and radial in the other. In each case the diaphragm bridges two relatively axially shiftable components mounting one of the ring members, so as to perfect the operation of the seal in preventing passage of fluid radially and axially and also preventing entry of dirt or foreign matter.

Referring to Figs. 1 and 2, the reference numeral 10 generally designates a seal in accordance with the first embodiment of the invention, which is shown in normal, relaxed and inoperative condition in Fig. 1, and in Fig. 2 as operatively applied to a pair of relatively rotatable parts. Seal 10 comprises an annular sealing ring 11 of a suitable sealing material, i. e., of metal, carbon or any other appropriate material or compound dictated by the intended use of the seal. Ring 11, in the operation of the seal, has relatively sliding, rotative face sealing engagement with an annular mating ring 12, also of a suitable sealing material, which is adapted for fixed engagement with the other of the two relatively rotatable parts. In the form illustrated, these parts may consist, for example, of a pump impeller 15, suitably mounted for rotation with a shaft 14 to which said impeller is secured. The mating ring 12 is provided with an internal annular groove 16 in which an annular packing member or O-ring 17 of an appropriate compressible material is disposed, this member sealingly engaging the shaft to prevent passage of fluid at a point radially inwardly of the mating ring 12.

Sealing ring 11 is carried by an annular housing assembly, generally designated 18, adapted for relatively fixed association with a housing 13 or corresponding part relative to which the shaft rotates. To this end, the assembly 18 consists of an annular, conformed mounting member 19 fixedly fitted at its external periphery to said part 13 by means of an intervening packing or gasket 20. Coacting with mounting member 19 is an annular sealing ring supporting member 21 coaxial therewith, the members 19, 20 being intended to have axial sliding movement relative to one another, but being restrained from relative rotating movement. To restrain such rotation, the mounting member 19 is provided with one or more internal axial slots or ways 22 receiving equally spaced lugs or fingers 23 on the supporting member 21. Members 19 and 21 are also shaped at a point outwardly of said slots and lugs to provide annular, mutually facing channels 24 which open axially toward one another. An annular sleeve-like diaphragm 25 of flexible sealing material is clamped at its opposite edges in channels 24 to prevent entry of fluid or foreign matter at this point. Said diaphragm flexes readily to permit relative axial movement of the members 19, 21 in the operation of the seal.

The sealing ring 11 is carried by the supporting member 21, on the side thereof adjacent mating ring 12, said member being countersunk at 26 for the force fit reception of said sealing ring. An internal coil compression spring 27 abuts ring 11 at one end and an internal shoulder 30 of mounting member 19 at its other end. The spring serves to urge the sealing ring 11 and supporting member 21 therefor, on the one hand, and the mounting member 19, on the other hand, in opposite directions, thereby axially distending the sleeve diaphragm 25 in the normal unmounted condition of the seal illustrated in Fig. 1.

The seal assembly is completed by an annular, sheet metal casing 28 which is rigidly crimped at one end around the periphery of annular supporting member 21 and coacts with diaphragm in constituting an external sealed housing coextensive axially with the seal. Casing 28 extends axially a substantial distance forwardly of sealing ring 11 and past mating ring 12, and at its forward edge is bent or spun radially inwardly to provide an annular stop rim 29. This rim radially overlaps the mating ring 12, and accordingly serves to prevent separation thereof from the assembly. This spring, at its opposite end, abuts an internal shoulder 30 on the mounting member 19.

In installing the assembly described above, the mounting member is fitted in housing 13 or a similar part and the mating ring is frictionally engaged by packing 17 with shaft 14, whereby to be held in relatively fixed relation to said shaft. Spring 27 is compressed somewhat by thrust engagement of the mating ring 12 with the hub of impeller 15 to hold the rear surface of the mating ring away from retaining or stop rim 29, rendering the casing 28 freely rotatable relative to said mating ring. So assembled, the seal operates reliably to prevent leakage along the shaft at a point radially inwardly of ring 12, by reason of packing ring 17; or between the coacting surfaces of the sealing and mating rings 11 and 12 respectively; or at the sleeve-like circumferential and axial area between mounting and supporting members 19, 21 respectively, by reason of the flexible sealing diaphragm 25.

In Fig. 3 I illustrate a somewhat modified embodiment incorporating a radial flexible sealing diaphragm 31, as distinguished from the axial type of Figs. 1 and 2. In this embodiment parts corresponding to those found in the form of Figs. 1 and 2 are designated by corresponding reference numerals, since the functions thereof are similar, even though certain specific details of form and disposition may be somewhat different.

In this modification, a sheet metal, external mounting housing for the seal is defined in part by the telescopingly force-fitted annular flanged casing members 32, 33, respectively. At one side thereof the member 33 is conformed to provide an annular retaining or stop rim 34 for the mating ring 12. At the other side thereof the outermost member 33 has an internally spun lip 35 of reduced thickness which serves to clamp the outer periphery of radial diaphragm 31 against an adjacent radial wall or flange 36 of the innermost casing member. Sealing ring 11 is fixedly mounted on an annular, sheet metal inner support 37 of U-shaped cross section encircling but spaced from shaft 38, whereby to provide a unitary assembly located radially inwardly of the radial wall 36 of member 32 and slidable axially relative to the outer casing housing members 32, 33. A forward lip 39 on support 37 secures the sealing ring 11 in place and a rear surface on said ring engages the internal periphery of diaphragm 31, coacting with an outturned annular flange 40 of support 37 to clamp the internal diaphragm periphery. It will be noted that a slight bulge is provided in the radial diaphragm to accommodate flexing thereof in the axial movement of the sealing ring. As in the first form, the rigid casing structure coacts with the diaphragm in defining a seal housing which is effectively closed at all points not provided with additional sealing means.

An annular undulatory or wave spring 41 is disposed in the space between the rear surface 42 of sealing ring 11 and the radial casing wall 36 to urge the sealing ring forwardly against a coacting surface on mating ring 12. The sealing ring is keyed to the casing member 32 in a manner to prevent relative rotation by means of a down-turned lug 43 on the latter engageable in a slot 44 of the sealing ring. Free relative axial movement in the operation of the seal is permitted, however.

The assembly of the seal of Fig. 3 to a pair of relatively rotatable parts is generally the same as that described in connection with Figs. 1 and 2, and it functions just as effectively to prevent leakage at the three points previously mentioned, i. e., between shaft 38 and packing member 17, between the coacting running surfaces of the sealing and mating rings, and at the radial diaphragm.

Mating ring 12 axially abuts a further member 45 with respect to which shaft 38 rotates, such as a housing or the like, and is held in angularly fixed relation thereto by a pin or pins 46 on said member which are receivable in recesses 47 in the mating ring.

It is apparent that variations can be made in certain of the specific details shown and described without departing from the spirit of the invention, hence, the invention should not be construed more narrowly than is consistent with the scope of the appended claims.

I claim:

1. A self-contained seal assembly for a pair of coaxial, relatively rotatable parts, comprising an annular sealing ring, means for mounting said ring in coaxial, rotatively fixed and axially shiftable relation to one of the parts, including an annular support adapted for fixed securement to said part, a second annular support in fixed rotative relation to the ring and first support, and an annular flexible element concentric with and secured to said supports to seal the space therebetween, a mating ring in slidable sealing engagement with said sealing ring and in nonrotative, axially sustained relation to the other part in the operative position of the assembly, spring means urging said rings together, and means in axially fixed relation to said sealing ring and restrainingly engageable axially with the mating ring to prevent displacement of the same from the assembly when unsustained by said other part.

2. A self-contained seal assembly for a pair of coaxial, relatively rotatable parts, comprising an annular sealing ring, means for mounting said ring in coaxial, rotatively fixed and axially shiftable relation to one of the parts, including an annular support adapted for fixed securement to said part, a second annular support in fixed rotative relation to the ring and first support, an annular flexible element concentric with and secured to said supports to seal the space therebetween, a mating ring in slidable sealing engagement with said sealing ring and in non-rotative, axially sustained relation to the other part in the operative position of the assembly, spring means urging said rings together, and means comprising an axial extension on one of said supports in axially fixed relation to said sealing ring and restrainingly engageable axially with the mating ring to prevent displacement of the same from the assembly when unsustained by said other part.

3. A self-contained seal assembly for a pair of coaxial, relatively rotatable parts, comprising an annular sealing ring, means for mounting said ring in coaxial, rotatively fixed and axially shiftable relation to one of the parts, including an annular support adapted for fixed securement to said part, a second annular support in fixed rotative relation to the ring and first support, an annular flexible element concentric with and secured to said supports to seal the space therebetween, a mating ring in slidable sealing engagement with said sealing ring and axially sustained by the other part in non-rotative relation thereto, spring means urging said rings together, said mating ring having sealing means adapted to be disposed in sealing relation to said other part to seal the assembly at that part, and an extension on said second annular support in axially fixed relation to said sealing ring, and restrainingly engageable axially with the mating ring to prevent displacement of the same from the assembly.

4. A self-contained seal assembly for a pair of coaxial, relatively rotatable parts, comprising an annular sealing ring, means for mounting said ring in coaxial, rotatively fixed and axially shiftable relation to one of the parts, including an annular support adapted for fixed securement to said part, a second annular support in fixed rotative relation to the ring and first support, said supports having locking engagement preventing relative rotation thereof, an annular flexible element concentric with and secured to said supports to seal the space therebetween, a mating ring in slidable sealing engagement with said sealing ring, spring means urging said rings together, said mating ring having sealing means adapted for sealing engagement with the other part to seal the assembly at that part and being in non-rotative relation to and axially sustained by the latter, and means on said second annular support in axially fixed relation to one of said rings and restrainingly engageable axially with the other ring to prevent displacement of the same from operative relation.

5. A self-contained seal for a pair of coaxial, relatively rotatable parts, comprising a sealing ring, means for mounting said ring in non-rotative, axially shiftable relation to one of said parts, including a support adapted to be secured to said last named part and an axially movable, non-rotative connection between said ring and support, means to seal the space between said support and said sealing ring, a mating ring having relatively rotatable sealing engagement with said sealing ring and adapted to be axially sustained by the other part in non-rotative relation thereto in the operative position of the assembly, a spring axially urging said rings for sealing engagement in a direction to thrust said mating ring against said other part, and means in axially fixed relation to said sealing ring and restrainingly engageable with said mating ring to prevent axial displacement of the latter when not so sustained.

6. A self-contained seal for a pair of coaxial, relatively rotatable parts, comprising a sealing ring, means for mounting said ring in non-rotative, axially shiftable relation to one of said parts, including a support adapted to be secured to said last named part and an axially movable, non-rotative connection between said ring and support, a flexible, tubular, axially extending diaphragm secured at its opposite margins in fixed relation to said support and said sealing ring, a mating ring having relatively rotatable sealing engagement with said sealing ring and adapted to be axially sustained by the other part in non-rotative relation thereto in the operative position of the assembly, a spring axially urging said rings for sealing engagement in a direction to thrust said mating ring against said other part, and radially extending means in axially fixed relation to said sealing ring restrainingly engageable with said mating ring to prevent axial displacement of the latter when not so sustained.

7. A seal adapted for installation as a self-contained unit between two relatively rotatable, concentrically arranged, inner and outer parts, comprising a rigid tubular housing provided at one end with an inturned flange, a sealing ring fixedly secured within the housing, a relatively rotatable mating ring loosely confined within the housing between the sealing ring and said inturned flange for fluid-tight, freely rotatable association with the sealing ring upon installation of the seal, a supporting ring behind the sealing ring in axially spaced relation to the latter, a coil spring compressed between the supporting ring and the sealing ring, means for preventing relative rotation of the supporting and sealing rings, and a flexible tubular diaphragm connecting the supporting ring with the sealing ring, said seal being adapted for insertion in a recess in said outer part in stationary sealed engagement with the latter, with the mating ring in stationary sealed engagement with said inner part.

8. A seal adapted for installation as a self-contained unit between two relatively rotatable, concentrically arranged, inner and outer parts, comprising a rigid tubular housing provided at one end with an inturned flange, a sealing ring fixedly secured within the housing, a relatively rotatable mating ring loosely confined within the housing between the sealing ring and said inturned flange for fluid-tight, freely rotatable association with the sealing ring upon installation of the seal, a supporting ring behind the sealing ring in axially spaced relation to the latter, a coil spring compressed between the supporting ring and the sealing ring, circumferentially interlocking formations on the supporting and sealing rings for preventing relative rotation therebetween while permitting axial separation thereof under the action of the spring, and a flexible tubular diaphragm connecting the supporting ring with the sealing ring, said seal being adapted for insertion in a recess in said outer part in stationary sealed engagement with the latter, with the mating ring in stationary sealed engagement with said inner part.

ROBERT O. ISENBARGER.

REFERENCES CITED

The following references are of record in the file of this patent:

UNITED STATES PATENTS

| Number | Name | Date |
|---|---|---|
| 1,886,147 | Baker et al. | Nov. 1, 1932 |
| 2,015,979 | Wahlmark | Oct. 1, 1935 |
| 2,287,207 | Vedovell | June 23, 1942 |
| 2,311,494 | Vedovell | Feb. 16, 1943 |
| 2,342,955 | Meyer | Feb. 29, 1944 |
| 2,358,830 | Schick | Sept. 26, 1944 |
| 2,429,953 | Bottomley | Oct. 28, 1947 |
| 2,444,713 | Solari | July 6, 1948 |